March 17, 1925.

A. H. MÜLLER 1,530,395

MEANS FOR TOWING BOATS, VESSELS, AND THE LIKE ON WATERWAYS

Filed June 27, 1924　　2 Sheets-Sheet 2

Patented Mar. 17, 1925.

1,530,396

UNITED STATES PATENT OFFICE.

DANIEL O'BRIEN, OF PALESTINE, TEXAS.

LOCK NUT.

Application filed January 18, 1924. Serial No. 687,118.

*To all whom it may concern:*

Be it known that I, DANIEL O'BRIEN, a citizen of the United States, and a resident of Palestine, in the county of Anderson and State of Texas, have invented a new and Improved Lock Nut, of which the following is a description.

My invention relates to lock nuts to be applied to ordinary bolts for holding the nut immovable.

The prime object of my invention is to provide a lock nut made in sections after the manner of a split nut, the one section having arms between which the other section is received, together with wedge means to tightly bind the sections on the bolt in a manner to prevent the displacement of the nut or a relative displacement of the nut sections.

Reference is to be had to the accompanying drawings forming a part of this specification, it being understood that the drawings are merely illustrative of one example of the invention.

Figure 1 is a front view of a lock nut embodying my invention, showing the same applied;

Figure 2 is a section on the line 2—2, Figure 1;

Figure 3:
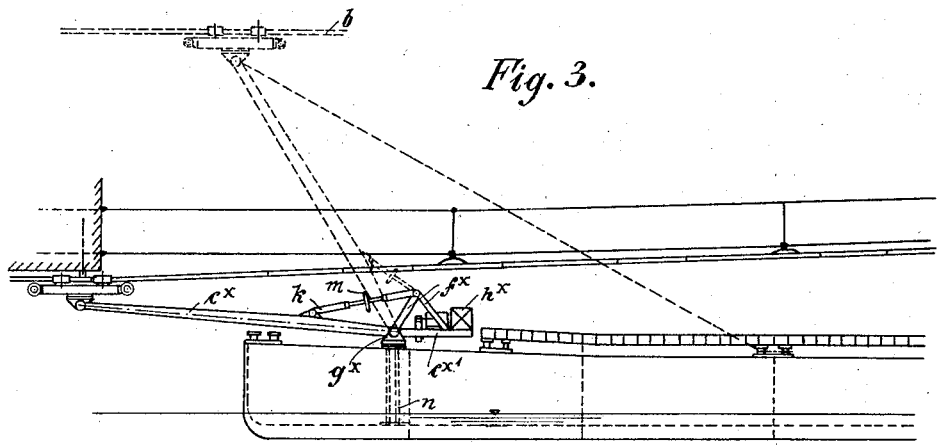
Figure 3 is a partly sectional front view of the separated elements of my improved lock nut.
Figure 4:
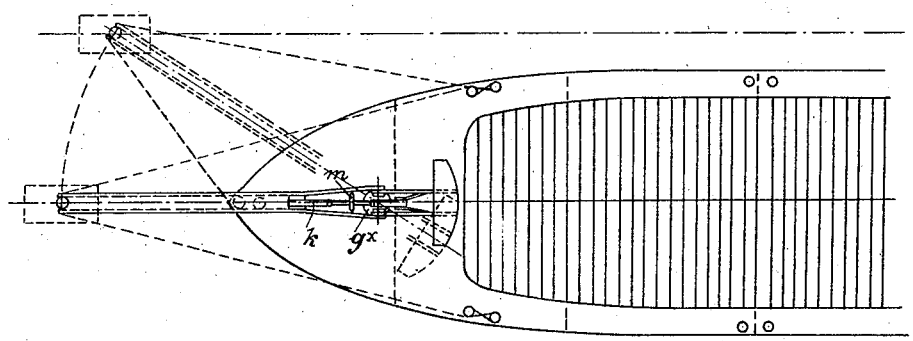

My improved lock nut is applicable to the threads 11 of any ordinary bolt 10 for uniting two parts, a fragment of one of which is indicated at A.

The nut is given the general form of a split nut being composed of similar sections 12, 13 adapted to meet at the median line of the nut. The one section as 12 is formed with parallel side arms 14 between which the other nut section 13 is snugly received. The said arms 14 are formed with holes 15 adapted to receive a key 16. The corresponding walls or sides 15ª, 15ᵇ, of the holes 15 are preferably in the same inclined plane to conform to the inclined side of the key which is wedge-shaped, the opposite side of the wedge or that side bearing against the nut section 13 being parallel with the adjacent side of said nut section to give a firm bearing against the latter. The key may be formed with a hole 17 to receive a cotter pin 18.

With the nut section placed on the bolt and the key 15 driven home, it will be obvious that the nut sections firmly bind against the bolt to prevent a relative turning of the nut and bolt.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim. For example, the key 16 may be a tapered or untapered cotter or it may have threads and a nut or other suitable device may be employed. It will be observed that the key 16 is driven from the right so that when driven into place the blow tends to tighten the nut while a blow to dislodge the key 16 tends to loosen the nut.

Having thus described my invention, I claim as new, and desire to secure by Letters Patent:

A lock nut formed in two sections to constitute it a split nut, one of the sections having arms between which the other section of the nut is received, said arms having holes therein outside of the second nut section, and a wedge key receivable in said holes and adapted to bind the nut sections firmly on a bolt.

DANIEL O'BRIEN.